US010181925B2

(12) United States Patent
Chretien

(10) Patent No.: US 10,181,925 B2
(45) Date of Patent: Jan. 15, 2019

(54) FAULT TOLERANT OPTICAL APPARATUS

(71) Applicant: Pascal Chretien, Oxley (AU)

(72) Inventor: Pascal Chretien, Oxley (AU)

( * ) Notice: Subject to any disclaimer, the term of this patent is extended or adjusted under 35 U.S.C. 154(b) by 0 days.

(21) Appl. No.: 15/760,354

(22) PCT Filed: Sep. 22, 2016

(86) PCT No.: PCT/EP2016/072620
§ 371 (c)(1),
(2) Date: Mar. 15, 2018

(87) PCT Pub. No.: WO2017/050942
PCT Pub. Date: Mar. 30, 2017

(65) Prior Publication Data
US 2018/0254844 A1    Sep. 6, 2018

(30) Foreign Application Priority Data
Sep. 22, 2015  (AU) .................. 2015903853

(51) Int. Cl.
H04J 14/02      (2006.01)
G02B 6/122      (2006.01)
G02B 6/42       (2006.01)
B64C 39/02      (2006.01)
H04B 10/80      (2013.01)

(52) U.S. Cl.
CPC .......... *H04J 14/028* (2013.01); *B64C 39/024* (2013.01); *G02B 6/1221* (2013.01); *G02B 6/42* (2013.01); *H04B 10/802* (2013.01); *H04B 10/803* (2013.01); *H04J 14/0256* (2013.01); *H04J 14/0284* (2013.01)

(58) Field of Classification Search
CPC .. H04J 14/028; H04J 14/0256; H04J 14/0284; H04B 10/802; H04B 10/803; G02B 6/42; G02B 6/1221; B64C 39/024
See application file for complete search history.

(56) References Cited

U.S. PATENT DOCUMENTS

| 4,447,118 A * | 5/1984 | Mulkey ............... G02B 6/4298 |
| | | 250/227.24 |
| 5,061,027 A * | 10/1991 | Richard ............... G02B 6/43 |
| | | 250/227.11 |
| 2002/0196502 A1 | 12/2002 | Perner |
| 2003/0179978 A1 | 9/2003 | Iwasaki |

(Continued)

FOREIGN PATENT DOCUMENTS

| EP | 2 187 542 A1 | 5/2010 |
| JP | 11355249 A * | 12/1999 |
| WO | 2004/030244 A1 | 4/2004 |

OTHER PUBLICATIONS

Written Opinion of the International Search Authority dated Jan. 24, 2017 of corresponding International application No. PCT/EP2016/072620; 7 pgs.

(Continued)

*Primary Examiner* — Leslie C Pascal
(74) *Attorney, Agent, or Firm* — Maier & Maier, PLLC

(57) ABSTRACT

A fault tolerant optical apparatus resilient to ballistic impact damages, capable of enabling distributed processing and networking and using the spectrophotometric transmission properties of polymer film.

13 Claims, 5 Drawing Sheets

(56) References Cited

U.S. PATENT DOCUMENTS

2004/0114854 A1    6/2004    Ouchi
2010/0098430 A1    4/2010    Chui et al.

OTHER PUBLICATIONS

International Search Report dated Jan. 24, 2017 of corresponding International application No. PCT/EP2016/072620; 4 pgs.
Robert D. Gardner et al., "PHONAV—A Photonic WDM Network Architecture for Next Generation Avionics Systems", Aerospace Conference, Mar. 1999, p. 451-466, vol. 2; 16 pgs.
Dexiang Wang et al., "A Fault-tolerant Backbone Network Architecture Targeting Time-critical Communication for Avionic WDM LANs", IEEE, Jun. 2009, p. 1-5; 5 pgs.

* cited by examiner

FAULT TOLERANT OPTICAL APPARATUS

FIELD

The object of the invention is a fault tolerant optical apparatus enabling distributed processing through the interconnection of multiple electronic systems, capable providing high speed data communication, multiple networking and distributed processing as well as being resilient to ballistic damages and EMP agressions. Said optical apparatus comprising an optically transparent polymer film enabling light propagation deployed throughout the vehicle and capable of providing optical communication between a plurality of optical transceiver interfaces connected to subsystems such as (but not limiting to) avionics and flight control systems. Said optical apparatus being capable of enabling a plurality of distinct and mutually isolated networks sharing the same transmission medium. The purpose of the disclosed optical apparatus is to be capable of providing provide ballistic impact resilience and EMP (Electromagnetic Pulse) and ESD (Electrostatic Discharge) resistance necessary to operate on today's battlefields.

The invention relates to the technical field of optical transmission and networking, preferably applied to aircraft having fixed wings or rotary wings, regardless of whether these are piloted or not. However, the invention can also apply to other domains such as land or marine vehicles, or even terrestrial communication or industrial systems working in a network.

BACKGROUND

Copper and/or aluminum based wiring looms have been used for decades to interconnect and provide information transfer between subsystems integrated in aircrafts and other types of vehicles. Wiring looms ageing, resulting from mechanical, electrochemical and thermal stresses, is a known source of system failure. This well-known weakness was proven to be the cause of a number of crashes (such as TWA 800). Moreover, military aircrafts require ballistic impact resilience imposing redundant electrical cablings, following different paths, subsequently adding weight at the expense of payload, as well as complicating maintenance operations. On an aeronautical standpoint, wiring faults are a recurrent cause of unscheduled maintenance, limiting aircraft availability and profitability. Consequently, there is a need to improve vehicle's fault tolerance and ballistic impact resilience and to reduce vehicle's production time and cost.

As EMP (Electromagnetic Pulse) weaponry based on flux compression generators feeding virtual cathode oscillators (or vircators) becomes more common on modern battlefield, RF hardening becomes a hallmark of military vehicles and equipments. High altitude detonation of a nuclear warhead at is another source of EMP which military systems must be protected against. However, the use of metal shielding, dissipative EMP protection and filtering make EMP hardened cablings significantly heavier than conventional wiring. Data lines are the most vulnerable to EMP aggression and Electrostatic Discharges (ESD) as they carry small signals and connect to the most sensitive and fragile components. To some extent, any conventional wiring is a cause of intrinsic electromagnetic weakness both on a radiated emission and radiated susceptibility stand points. Industry's common answer to this problem is to use physically heavier shielded cabling to achieve electromagnetic protection. Given this situation, a further aim of the invention is to significantly reduce the vehicle's vulnerability to EMP aggressions.

Referring to modern electric, or hybrid-electric drive trains, copper and/or aluminum, based wiring is a known weakness, when integrated on aircrafts. Electric drive trains are now being integrated on many UAV and manned aircrafts in the form of small power plant. However, those propulsion systems are usually developed around standard off-shelf components. The usual split configuration includes one or more electric motor(s) powered by one or more separate controller(s) altogether managed by an external control unit. One of the main limitations of those electric propulsion systems resides in their poor electromagnetic compatibility with the surrounding environment: Fast switching power circuitry (such as IGBT and/or MOSFETS) commonly used in motor controller in order to minimize power losses is one cause of electromagnetic compatibility problem. Such circuitry produces high order harmonics, hence significant interference with surrounding avionics and onboard electronic systems. Interferences are generated by controller units in two forms: Radiated Emissions (RE) and/or Conducted Emissions (CE). The former refers to free space propagation of electromagnetic radio waves, whereas the later refers to electromagnetic signals propagating along the power lines and data cables, potentially disturbing the operation of aircraft's systems. Radiated emissions suppression usually requires installing heavy metallic shielding around the controller circuitry, whereas conducted emissions are mitigated by using intrinsically heavy inline filters inserted in the controllers' DC power ports, in combination with shielded cables. Additionally, RF hardening of peripheral avionics and electronics requires a multitude of inline filters to be installed on the inputs/output ports (power supply and data lines) of each avionic system operating in the vicinity of the electric power plant. If those, somewhat heavy, fixes can mitigate the detrimental effect of conducted emissions, they negatively impact system's weight. Given this situation, another aim of the invention is to reduce the vehicle's weight, yet keeping RE and CE interferences under control.

Referring to military systems, industry's usual answer to Electromagnetic Pulse (EMP) and Electrostatic Discharge (ESD) resilience is through the use of multiple optical fibers carrying data communication, deployed in place of conventional copper/aluminum cabling. However, optical fibers and their associated connectors are traditionally quite fragile, require large bending radius and can become heavy when mechanically reinforced to survive battle damages. Another limitation of optical fibers is the inherent susceptibility of the connectors to dust ingress, resulting in difficult maintenance on a Theater of Operations. Considering the high vibration environment found on some military aircrafts, connecting many subsystems in star and spur topologies to the aircraft's flight computer, through a network of multiple conventional optical fibers drastically increases the number of connectors and optical interface and is not a recommended option due to high production cost and statistically reduced reliability. Besides, those systems still suffer from obvious vulnerabilities to ballistic damages as star and spur topologies are intrinsic sources of Single Point Of Failure. Consequently, redundant routes are necessary (in the same manner as with copper wiring) which negatively impacts weight budget. Another aim of the invention is to propose a suitable solution to those current limitations.

In another domain, conventional fly by wire architectures revolving around multiple-redundant centralized computers have become common practice to achieve failure rate compatible with airline standards (exhibiting calculated failure rates as low as $1.10^{-9}$ per flight hour). However, those inherently complex and heavy systems are expensive and difficult to transfer to UAV operating on the battlefield. Furthermore, they revolve around inherently centralized computer units suffering from intrinsic ballistic impact weakness. Physically distributing the processing power where it is needed (that is, close to the subsystems being managed) is a solution offering better ballistic impact resilience, although requiring more networking capacity. Such solution revolves around several isolated high speed networks allocated to specific domains (flight controls, engine management, fuel systems, navigation, ECM, ECCM, ISTAR systems). However, conventional wiring suffers from inherent bandwidth limitation, hence limited data speed capability. As high-capacity networking is required in the context of distributed processing, the need for high speed data transmission is stretching data carrying capacity of copper based wiring looms to their limit. Bandwidth limitation of conventional wiring has direct consequence on the backhaul architecture used to interconnect sub-systems: traditionally, star and spurs topologies are the preferred option as they offer the better capacity, but at the expense of fault protection capability. By contrast, ring topologies provide superior fault protection. However, they are difficult to implement in the context of distributed processing due to their inherent bandwidth limitation. Consequently, there is a need to improve distributed intelligence and data carrying capacity, yet not scarifying ballistic resilience.

Patent documents US20040114854 (OUCHI), US20030179978 (IWASAKI), US20100098430 (CHUI), US20020196502 (PERNER) teach us that polymer films can be used to carry light signals in the same manner as an optical waveguide does. In particular, US20040114854 (OUCHI) teaches us that specific optical devices may be used to narrow the emission angle of light signals, for example, to 90 degrees, in order to transmit light signals only to a certain area of the optical waveguide. Those patents address the transmission of light signals through a polymer film; however, none of them provide a solution to network isolation, distributed processing and ballistic impact resilience. In particular, the directional solution disclosed by US20040114854 (OUCHI) increases vulnerability to the effects of ballistic damages.

In general, it would be desirable to have fault tolerant optical apparatus that addresses at least some of the above disadvantages, as well as possibly other issues.

SUMMARY

The proposed solution is therefore a fault tolerant optical apparatus comprising:
- a transparent polymer film waveguide for transmitting light signals in an omnidirectional manner,
- a plurality of transceiver units each one comprising an optical transceiver interface, a controller unit and a data interface, said plurality of transceiver units being interconnected via the waveguide, in order to inject light signals to said waveguide and receive light signals from said waveguide, said plurality of transceiver units forming at least two isolated meshed networks,
  - a dedicated wavelength being allocated to each meshed network, so that the transceiver units belonging to a meshed network only process light signals of the dedicated wavelength allocated to that network,
  - a plurality of electronic equipments, each one connected and managed by a transceiver unit,
  - the controller unit embedded in each transceiver unit is programmed with instructions enabling the management of the electronic equipment connected to said transceiver unit, according to the light signals received by the optical transceiver interface embedded in said transceiver unit,
  - the controller unit embedded in each transceiver unit is also programmed with instructions:
    - enabling the supervision of at least one more controller unit belonging to another transceiver unit being part of the same meshed network,
    - enabling the management of the electronic equipment connected to said another transceiver unit, in the event of a failure of said at least one more controller unit.

The disclosed invention intends solving the problems related to the prior art. Moreover, the transparent polymer film waveguide can be deployed and possibly bonded or fastened onto the inner part of an airframe (or vehicle). Light signals propagate within the optical layer of this transparent film waveguide in the same manner as in multimode optical fiber, but in an omnidirectional manner (notwithstanding anisotropic properties resulting from the film's manufacturing process) in both X and Y directions. Leveraging on the omnidirectional propagation within the polymer, a meshed network can be created, enabling interconnection between a plurality of transceiver units. Several steps are taken to create isolated meshed networking presenting a high level of isolation, through the use, for example, of Wavelength Division Multiplexing and appropriate polymers formulation leading to distinctive transmission and absorption windows at various wavelengths. The optical transceiver interface act as optical pickups connected to the transparent film waveguide.

Optical fiber, cannot suffer ballistic damages without impairing data communication. By contrast the disclosed invention utilizes an appropriate polymer waveguide capable of enhancing light diffusion and scattering within the material, in such manner that light signals are able to travel around the ballistic damages. Being optically based, this solution significantly improves bandwidth, hence data carrying capacity and brings inherent resilience to EMP aggressions. Moreover, the transparent polymer film waveguide is particularly advantageous when integrated in composite airframes, where it can intimately follow the internal shapes, subsequently leading to seamless integration. The transparent polymer film waveguide can also be integrated into a composite airframe in the same way as a layer of composite fabric (cloth).

Consequently, the only copper or aluminum wiring remaining in the aircraft is the power cabling carrying AC or DC supply to the electronic equipment. This copper or aluminum based power cabling is considerably simpler than conventional wiring looms and can easily be duplicated for fault diversity. Some of the weight savings resulting from the elimination of signaling cabling can be advantageously utilized to install delocalized power supply systems (e.g. batteries, super-capacitors and/or solar cells) next to the vital equipments, resulting in improved system reliability and resistance to ballistic damages. Systems revolving around distributed processing can tolerate more damages and subsequently insure better survivability of the aircraft than conventional centralized processors.

Preferentially, the polymer film comprises macromolecules and doping elements capable of enhancing light diffusion and scattering in the material.

Optical discontinuities can be created in the transparent polymer film waveguide in order to provide light sampling.

Preferentially, each controller unit comprise one or more microcontrollers and/or Field Programmable Gate Array, programmed with instructions enabling networking, data access, data framing, bit insertion and Forward Error Correction functions.

At least one controller unit embedded into a transceiver unit may be programmed with instructions enabling that transceiver unit acting as active repeaters in order to relay and regenerate the light signals received by its own optical transceiver interface, said optical transceiver interface being fitted with optical filters.

A communication protocol can be used to interconnect the different controller units, said protocol being based on Ethernet or Transmission Control Protocol or Internet Protocol suite, or CAN.

According to an embodiment of the invention, each meshed network is individually capable of establishing data communications between a plurality of transceiver units belonging to said meshed network and data communication between the different transceiver units can use one or more of the following data access modes: Time Division Multiple Access; Code Division Multiple Access (Direct-Sequence Spread Spectrum); Orthogonal Frequency Division Multiplexing; and/or Frequency and/or phase shift keying of multiple subcarriers.

The controller unit embedded in each transceiver unit may be programmed with instructions enabling the management of the electronic equipment connected to said transceiver unit, according to preprogrammed sequence of instructions, in the event of a failure of the associated optical transceiver interface and/or in the case of loss of light signals (e.g. faulty master unit).

The optical transceiver interface of each transceiver unit belonging to a given meshed network, can be equipped with an optical filter tuned to the wavelength allocated to said meshed network.

Another aspect of the invention is an aircraft with a fault tolerant optical apparatus comprising:
  a transparent polymer film waveguide for transmitting light signals in an omnidirectional manner,
  a plurality of transceiver units each one comprising an optical transceiver interface, a controller unit and a data interface, said plurality of transceiver units being interconnected via the waveguide, in order to inject light signals to said waveguide and receive light signals from said waveguide, said plurality of transceiver units forming at least two isolated meshed networks,
    a dedicated wavelength being allocated to each meshed network, so that the transceiver units belonging to meshed network only process light signals at the dedicated wavelength,
  a plurality of electronic equipments, each one connected and managed by a transceiver unit,
  the controller unit embedded in each transceiver unit is programmed with instructions enabling the management of the electronic equipment connected to said transceiver unit, according to the light signals received by the optical transceiver interface embedded in said transceiver unit,
  the controller unit embedded in each transceiver unit is also programmed with instructions:
    enabling the supervision of at least one more controller unit belonging to another transceiver unit being part of the same meshed network,
    enabling the management of the electronic equipment connected to said another transceiver unit, in the event of a failure of said at least one more controller unit.

This aircraft can comprise an airframe, wherein the optical apparatus is restrained or bonded onto said airframe.

This aircraft can comprise:
  a master control unit,
  the polymer film waveguide enabling communication between said master control unit and a plurality of transceiver units being part of a given meshed network,
  said plurality of transceiver units being capable of mutual communication and autonomous processing without requiring intervention from said master control unit.

The control units may be programmed to operate in order to autonomously provide the processing required to maintaining safe flying condition in the event of the failure of a master control unit.

BRIEF DESCRIPTION OF THE FIGURES

A more complete understanding of the embodiments of the present disclosure may be derived by referring to the detailed specification and claims when considered in conjunction with the following figures, wherein like reference refer to similar elements throughout the figures. The figures are provided to facilitate understanding of the disclosure without limiting the breadth, scope, scale, or applicability of the disclosure. for sake of clarity, the drawings are not necessarily made to scale:

FIG. 2 depicts light propagation through the polymer waveguide (components are not to scale for clarity sake).

DETAILED DESCRIPTION OF THE FIGURES

The following detailed specification is exemplary in nature and is not intended to limit the disclosure or the application and uses of the embodiments of the disclosure. Descriptions of specific devices, techniques, and applications are provided only as examples. As would be apparent to one of ordinary skill in the art after reading this specification, the following are examples and embodiments of the disclosure and are not limited to operating in accordance with these examples. Other embodiments may be used and structural changes may be made without departing from the scope of the exemplary embodiments of the present disclosure.

Embodiments of the disclosure may be described herein in terms of functional and/or logical block components and various processing steps. It should be appreciated that such block components may be realized by any number of hardware, software, and/or firmware components configured to perform the specified functions. For the sake of brevity, conventional techniques and components specifically constituting the controller unit, data transmission interface, and Master Control Unit, may not be described in detail herein, the specification being limited to system level. In addition, those skilled in the art will appreciate that embodiments of the present disclosure may be practiced in conjunction with a variety of structural bodies, and that the embodiments described herein are merely example embodiments of the disclosure.

The ballistic resilient optical apparatus is primarily capable of providing data information networking, sub-networking and distributed processing between aircraft electronic equipments in replacement of conventional wiring traditionally utilized to carry signals. The communication medium is based on a polymer film waveguide OPF restrained or bonded into the airframe, enabling optical propagation through the thickness of its layer.

Figure 1:
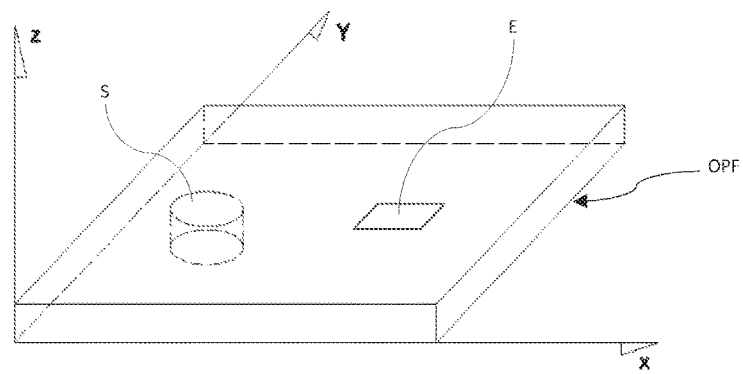
FIG. 1 depicts a three-dimensional view of a section of polymer film waveguide according to the invention with the discontinuities enabling light sampling (etching and punching)
Figure 2:
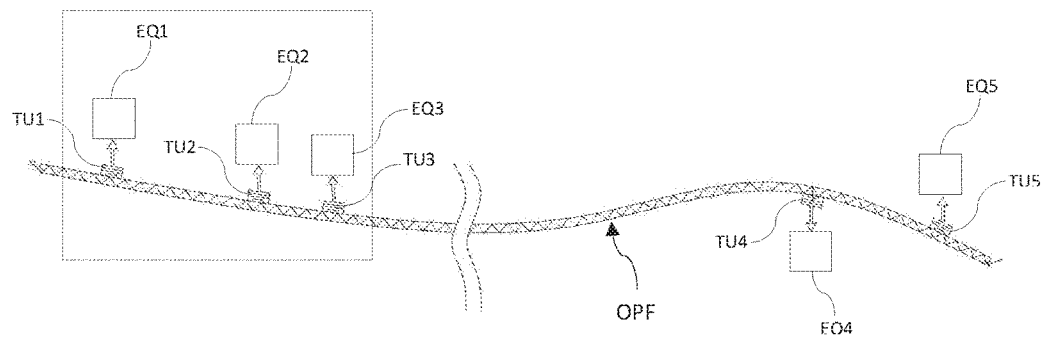
FIG. 2 is a section of a polymer film waveguide according to the invention, onto which is connected a plurality of transceiver units.
Figure 3:
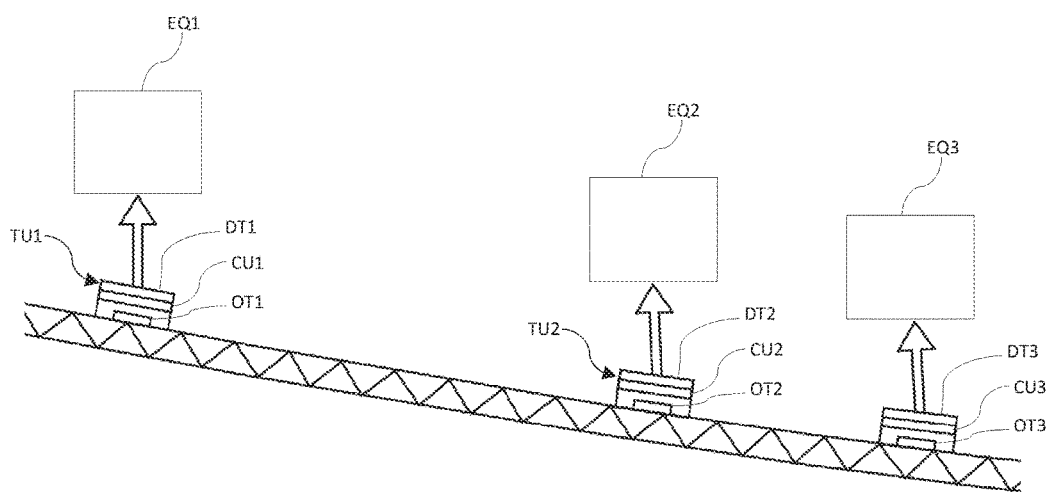
FIG. 3 is an enlargement of the dotted line detail of the arrangement depicted in FIG. 2.

The waveguide OPF detailed in FIG. 1, FIG. 2 and FIG. 3 comprises a transparent polymer film inside which light signals transmission is possible in a similar manner to a multimode optical fiber.

Figure 4:
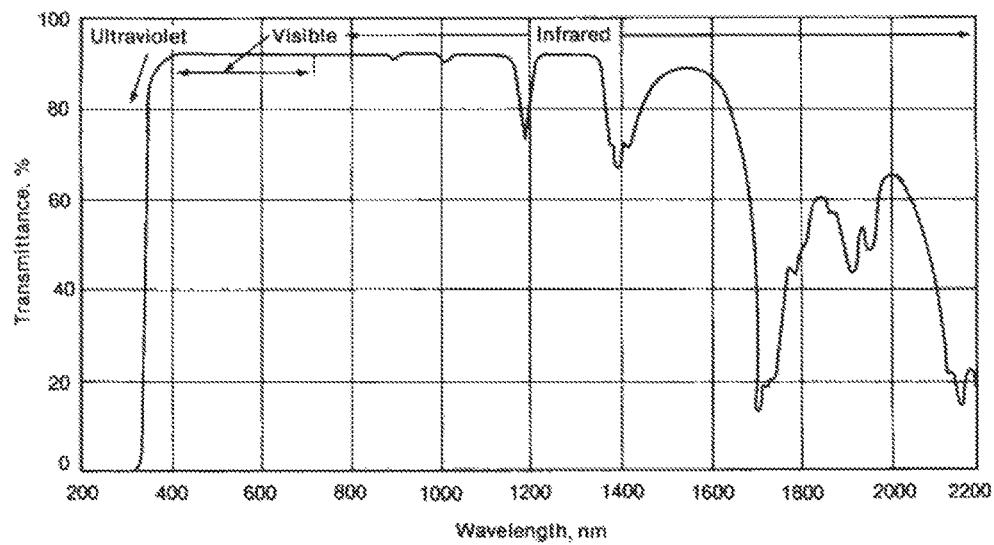
FIG. 4 details the spectrophotometric transmission of a typical polymer where various light absorbance and transmittance windows can be seen (wavelength of maximum attenuation and maximum transmission).

FIG. 1 depicts a three-dimensional view of a section of the waveguide OPF. Light signals can propagate in the X and Y directions in an omnidirectional manner or a quasi-omnidirectional manner, whereas they bounce on the top and bottom boundaries of the film, in the Z plane. As such the polymer layer operates as a multi-mode optical waveguide, propagating in both X and Y directions of the waveguide OPF. Two optical pickups mean are depicted: an etching E and a straight through S punching. Etching, punching, or pinching the film are some of the solutions creating optical discontinuities in order to provide light sampling (coupling). The polymer material constituting the film is appropriately formulated with macromolecules and doping elements capable of enhancing light diffusion and scattering in the material. Such polymer is currently produced by the industry and can be formulated on demand, with different molecular chains and doping elements, in such manner to enhance light diffusion, light transmittance and light absorption at different wavelengths. FIG. 3 shows the direction D of propagation of light signals into a magnified section of the polymer film waveguide OPF. The size of the macromolecules constituting the polymer film, its chemical composition, the use of doping elements and the fabrication process such as extrusion, or rolling are some of the factors influencing the optical properties of this transmission medium. Those parameters can be adjusted to enhance light diffusion and scattering in order to circumvent discontinuities subsequent to ballistic damages Moreover, wavelengths of windows of best transmittance and highest absorption can be advantageously leveraged to improve inter-network isolation. As an example, FIG. 4 depicts the spectrophotometric transmission of a notional optical polymer film, where various light absorbance and transmittance windows can be seen (wavelength of maximum absorption and wavelength of best transmittance).

A light emitting unit, connected to the aircraft's Master Control Unit, MCU, is used to transmit and receive light signals in the optical waveguide OPF. The light emitting unit can use light signals across a spectrum ranging from the infrared, to the ultra violet, or a combination of several discrete wavelengths. However, wavelengths corresponding to best transmittance shall be preferred when low transmission losses are necessary to achieve communication over significant distances. Conversely wavelengths corresponding to the peak of absorption in the waveguide OPF may be used for short range transmission, for example when localized networking is necessary: the high absorption at a particular wavelength can be advantageously used to enhance internetwork isolation. Thus, network segregation can be obtained by advantageously assigning different wavelengths to different mesh networks and enhanced by leveraging propagation characteristics in the transmission windows and absorption windows. As an example, a first dedicated wavelength is allocated to a first meshed network, and a second dedicated wavelength different from the first wavelength is allocated to a second meshed network. The transceiver units belonging to the first meshed network only process light signals at the first wavelength, rejecting light signals at the second wavelength. And the transceiver units belonging to the second meshed network only process light signals at the second wavelength, rejecting light signals at the first wavelength. The rejection process being a combination of one or several of the three methods:

Sensor's natural selectivity (where the photodiodes or other light sensors are selected in such manner that their wavelength response naturally rejects unwanted signals coming from other networks.

Filtering: where bandpass, high pass, or low pass optical filters are installed onto photodiodes or light sensors in order to reject unwanted wavelength.

Spectrophotometric properties of the optical film to attenuate certain wavelengths with respect to others.

Referring to FIG. 2, a plurality of transceiver units TU1-TU5 afferent to the multiple electronic equipments EQ1-EQ5 are optically connected to the polymer waveguide OPF and deployed throughout the aircraft or the vehicle. Those electronic equipments can be: landing gear actuators, tail rotor actuators, engine management system, transmission system, flap control actuators, avionics equipments, flight control actuators, environmental control . . . or any equipment requiring connection to the network.

System deployment is as follows: wherever given electronic equipment needs to be connected to the network and data communication is necessary, the polymer film waveguide OPF is pinched, punched or etched and a transceiver unit TU is installed. The optical discontinuity resulting from the pinching, punching or etching of the polymer film waveguide OPF enables some coupling of the light propagating inside said film with the transceiver unit TU, through an optical pickup device such as prism/lenses or diffuser assembly part of the optical transceiver interface OT (optical frontend), belonging to the transceiver unit. Conversely the aircraft's Master Control Unit front end and optical interface revolves around the same architecture.

Accordingly, a plurality of optical transceiver units TU1-TU5 is optically connected to the polymer film OPF to inject and receive light signals to/from said polymer film. As such the polymer film OPF operates as a multi-mode optical waveguide, propagating in both X and Y directions of the film, as shown by FIG. 1. As an example, the transceiver units TU1-TU3 are belonging to a first meshed network and the transceiver units TU4-TU5 are belonging to a second meshed network as depicted above.

Figure 8:
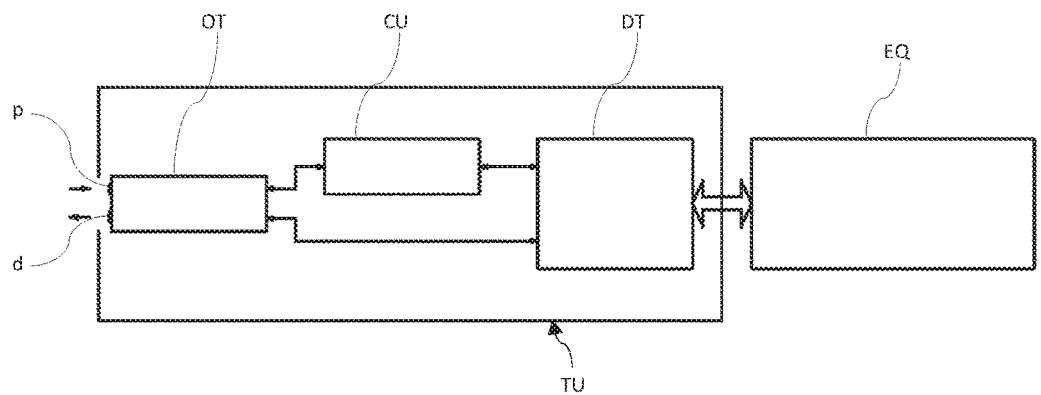
FIG. 8 is a block diagram of a transceiver unit according to the invention.

FIG. 8, shows that each transceiver unit TU comprises an optical transceiver interface OT and a controller unit CU as well as a data interface DT (electrical backend connection of the transceiver unit TU) connected to the equipment being managed. Power supply of the transceiver unit can be local (e.g. battery, supercapacitor, or solar panel . . . ), or may come from the aircraft's main power bus, or come from the electronic equipments' to which the transceiver unit is connected to.

The optical transceiver interface, OT, is configured to inject and receive light signals to/from the polymer film waveguide OPF. The transmitter section of the optical transceiver interface OT consists of one or several laser diodes (or LED), d, injecting light signals into the polymer film waveguide OPF, through optical components such as optical filters (when required), antireflective coating, prism/lenses or diffusers interfaces optimizing the transmission coefficient at the film interface. Conversely, the receiver section of the optical transceiver interface OT consists of one or more photodiodes, p, matched to appropriate filters, prism/lenses, or diffuser assemblies receiving the optical signals coming from the etched area of the polymer film waveguide OPF.

Figure 5:
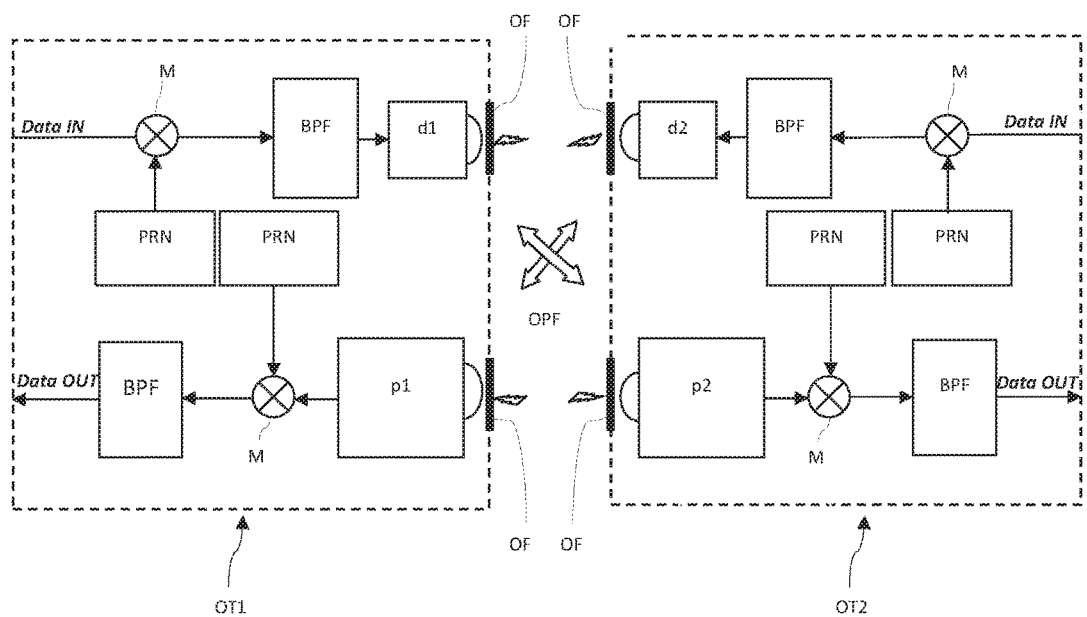
FIG. 5 is a block diagram showing the optical front ends of two optical transceiver interfaces.

The optical transceiver interface OT comprises a front end circuitry (such as depicted in FIG. 5) necessary to encode/decode useful information and drive the laser diodes (or LED) d as well as the photodiodes 2. The optical transceiver interface OT, controller unit CU and data transmission interface DT comprise one or more microcontroller and/or FPGA programmed with instructions enabling networking, data access, data framing, bit insertion and Forward Error Correction functions. The data transmission interface DT enables the connection with the electronic equipment EQ, or subsystem supervised by the transceiver unit TU. The data transmission interface, DT, also comprises a hitless switch enabling data switching without loss of information. This hitless switch is used to bypass the controller unit CU and establish a direct data connection between the optical transceiver interface OT and the data interface DT (depicted in the block diagram FIG. 8 by the lower arrow under the controller unit CU, connecting the data interface DT with the optical transceiver interface OT), when the controller unit CU is found faulty. Those microcontrollers may also emulate standard aviation data communication protocols such as ARINC 429, 629 or even CAN in order to facilitate the integration with standard avionics. Moreover, optical transceiver interface OT, controller unit CU and data transmission interface DT can be programmed with instructions enabling autonomous control of the electronic equipment EQ they are connected to.

A notable feature of the transceiver unit TU is that it can execute both local and regional management. Another notable feature of the transceiver unit, TU is that it enables distributed processing through meshed networking provided by the polymer film OPF interconnecting a multitude of transceiver units TUi (transceiver unit of order "i"). By distributing microcontrollers and subsequent processing capability in-situ, directly in the vicinity of the subsystem being managed, the need for conventional centralized processing is drastically reduced (or even eliminated). Such distributed intelligence reduces data traffic as well as circumventing transmission delays, by eliminating the need for information to travel back and forth between sub-systems (e.g. servo flap actuators) and central processing unit. This functionality is achieved by the use of the controller units CU and associated sensors embedded in each transceiver unit TU and capable of processing in order to make local and regional decisions.

Local decisions processes are individually elaborated by the controller unit CU embedded in each transceiver unit TU to manage the equipment it is electrically connected to. The resulting orders are applied, via the data interface DT, to the electronic equipment EQ physically connected to that transceiver unit TU.

By contrast, regional decision processes apply to one of several electronic equipments and their associated controller units located within a given physical distance of the said controller unit. For example, this distance can be up to several meters. In other words, and referring to regional management, each transceiver unit is capable of managing not only its own local electronic equipment, but also surrounding electronic equipments in what is hereinafter defined as regional management area.

Figure 7:
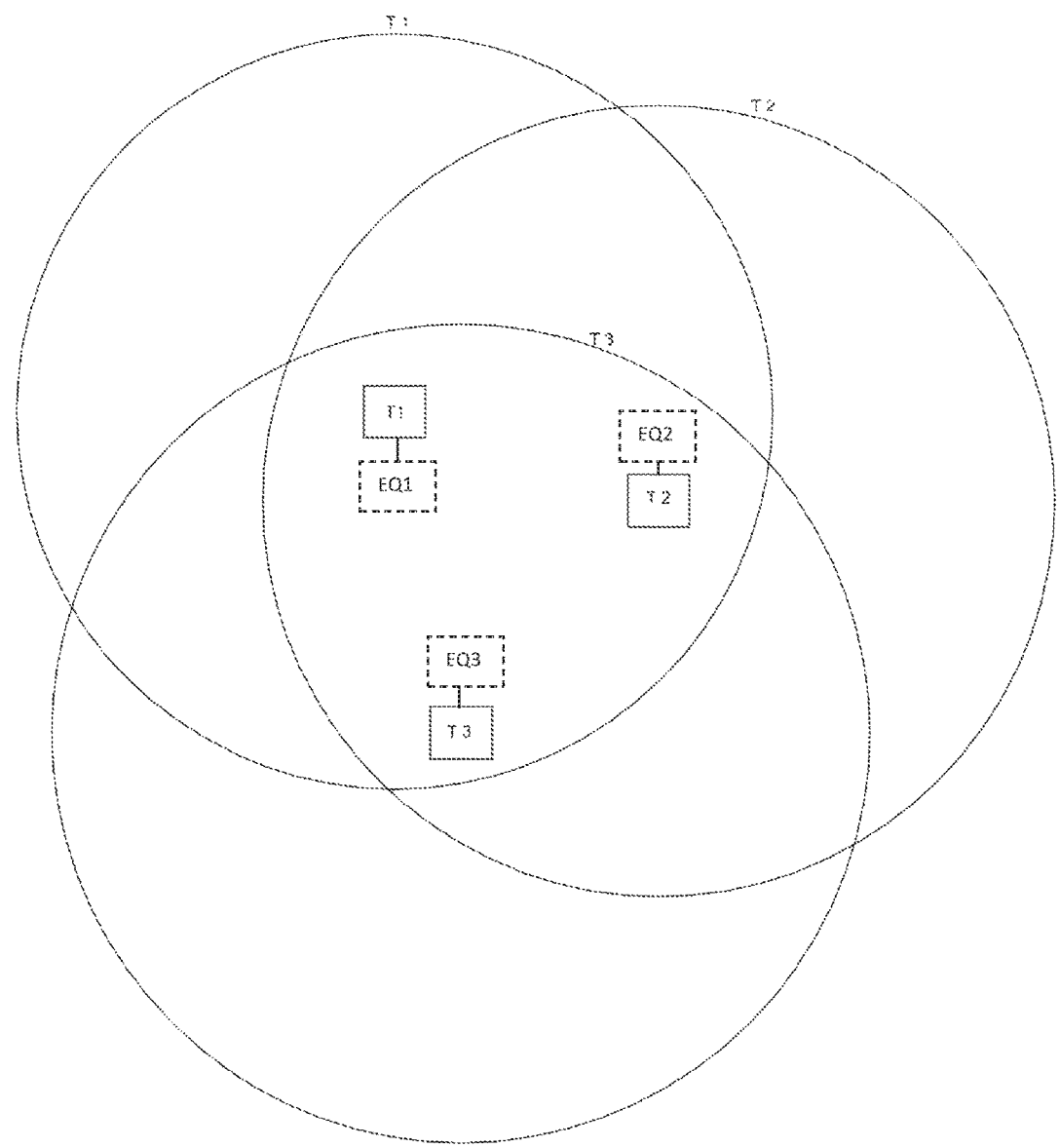
FIG. 7 depicts the regional coverage areas of 3 transceiver units showing a management overlapping.

FIG. 7 depicts the exemplary coverage areas of three transceiver units TU1, TU2 and TU3 showing regional overlapping enabling several transceiver units to monitor each other's in view of providing integrity monitoring and fault tolerance. In addition to managing its dedicated local equipment EQ1, the transceiver unit TU1 continuously receives (through the optical interface) information afferent to transceiver units TU2 and TU3 operation. By the same token, transceiver unit TU2 continuously receives information from transceiver units TU1 and TU3, and transceiver unit TU3 continuously receives information from transceiver units TU1 and TU2. This is made possible because all transceiver units continuously broadcast, (e.g. through dedicated time slots), to the other transceiver units operating in the same regional area, their health status, as well as some of the content of their input & output signals. By overlapping the coverage footprints of several regional management areas continuously performing mutual integrity monitoring, fault diversity is made possible. In this configuration a given valid transceiver unit can supervise one or more faulty transceiver units located within the same overlapping coverage area. This functionality can maintain system operation and preserve aircraft safety by applying pre-programmed instructions and algorithms, in the event of degraded systems functionalities, such as communication loss with the aircraft's Master Control Unit, or degraded operation of the later.

Figure 9:
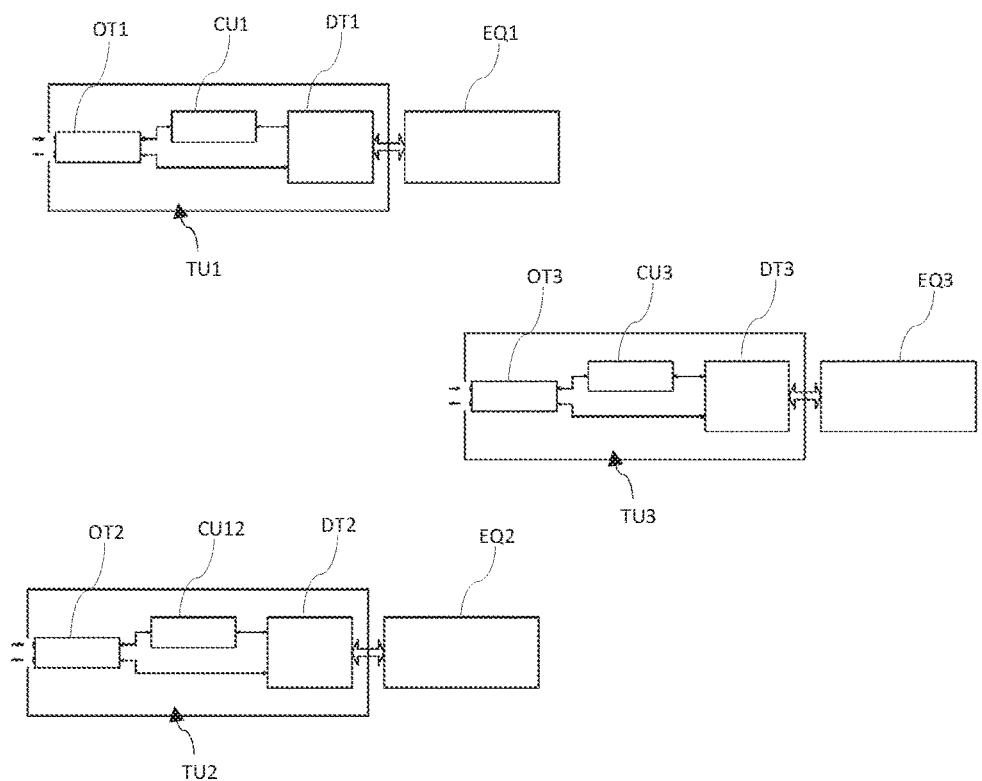
FIG. 9 depicts mutual management enabling fault tolerance between a sample of three transceiver units belonging to the same meshed network.

FIG. 9 depicts three exemplary transceiver units TU1, TU2 and TU3 belonging to the same meshed network. In addition to being fitted with multiples sensors necessary to the mission (such as pressure, temperature, position, etc.), the controller unit CU1 is programmed with instructions enabling the management of the electronic equipment EQ1 connected, via the data interface DT1, to transceiver unit TU1 according to the light signals received by the optical transceiver interface OT1, as well as the management of the other electronic equipments EQ2 and EQ3. By the same token, the controller unit CU2 is programmed with instructions enabling the management of the electronic equipment EQ2 connected, via the data interface DT2, to transceiver unit TU2 according to the light signals received by the optical transceiver interface OT2, as well as the management of the other electronic equipments EQ1 and EQ3. And the controller unit CU3 is programmed with instructions enabling the management of the electronic equipment EQ3 connected, via the data interface DT3, to transceiver unit TU3 according to the light signals received by the optical transceiver interface OT3 as well as the management of the other electronic equipments EQ1 and EQ2.

For example, let's assume that the controller unit CU2 of the transceiver unit TU2 is faulty. Then controller unit CU1, CU3, belonging to transceiver units TU1 and TU3 will detect an integrity fault by comparing the transceiver unit TU2's actual output with its input signal and the predicted output. A warning signal will be subsequently elaborated by controller units CU1 and CU3. As a result, controller unit CU2 will be remotely turned off by transceiver units TU1 and TU3 and the data interface DT2 can be remotely configured in such manner to bypass controller unit CU2 and directly connect to the optical frontend interface OT2, so EQ2 can now be remotely managed by controller unit CU1 or CU3. In this new situation, transceiver unit TU2 becomes a slave and transceiver unit TU1, or TU3 become the master. This operation enables to maintain control over the equipment EQ2 normally managed by transceiver unit TU2 without using hardware redundancy. The decision criteria driving which of controller unit CU1 or CU3 should be the master can be based on signal strength and CPU load of controller units CU1 and CU3. As a result, the instructions necessary to drive the components connected to transceiver unit TU2 are now elaborated by transceiver units TU1 and/or TU3. Practically speaking this means that each controller unit must be designed in such manner to be capable of handling the processing load of at least two transceiver units, a characteristic easy to achieve, considering today's microcontroller processing power and their low cost. In addition to providing processor fault protection, distributed processing can be advantageously leveraged to provide powerful real time processing, by combining the processing power present in each transceiver unit TU1, TU2 and TU3 when required. This feature can be advantageously used when performing real-time situational awareness, by fusing and processing information coming from the various transceiver units and their associated sensors. Moreover, basic emergency behavior can be programmed in the controller unit CU1, CU2, and CU3 in such manner that should all connection be lost with the rest of the network (e.g. optical front end interface OT failure, or master control unit MCU failure), a preprogrammed sequence of instructions resident in each transceiver unit TU1, TU2, TU3 will enable the management of equipment EQ1, EQ2, EQ3 in function of the information collected by the sensors connected to the transceiver unit and a planned sequence enabling safe recovery of the situation. Additionally, transverse (or mutual) communication between the transceiver units enables autonomous processing, preserving aircraft's safety during an emergency, for instance in the case of master control unit failure. For instance, a controller unit managing an aileron could position the said aileron at a neutral angle, should all connection be lost, subsequently enabling safe recovery of the aircraft using the aerodynamic authority left in the remaining valid ailerons. This functionality is currently impossible to conventional FBW systems using centralized computing and "dumb" actuators (actuator without processing power or flight management capability). This distributed intelligence and self-healing capability is capable of high level decisions outperforms conventional aircraft architectures in that it provides superior fault tolerance, as well as ballistic impact resilience.

In brief, controller units CU1, CU2, CU3 are dimensioned and programmed in such manner to handle the management of several peripheral equipments EQ1, EQ2, EQ3 as well as taking decision normally incumbent to centralized flight computers deployed in FBW architectures. Consequently, a valid controller unit can manage one or several faulty peripheral components. In this topology, different codes can be used to program different controller units in view of providing programming fault diversity. Overlapping regional management areas reduces (or eliminates) the need for multiple redundant central processing unit usually deployed in conventional fly by wire systems. For instance, the Airbus A320 fly by wire system revolves around a fully centralized quintuple redundant computer system, whereby five computers units operate in parallel, each computer unit being composed of two channels: one for processing and one for integrity monitoring; both channels being developed by different teams, in an attempt to enable two fault diversity. By concentrating all the processing power in one location, such architecture is vulnerable to ballistic damages and is inherently heavy (when the whole system is fully functional, only one computer is handling the processing workload whereas the remaining four computers are serving as backup and are not effectively contributing to the mission, yet negatively affecting weight budget). By contrast, the disclosed invention presents significant weight and cost savings, a particularly important advantage in UAV. Controller units CU can all revolve around identical hardware (although being programmed with different codes), enabling low cost mass production. Consequently, the workload incumbent to a Master Control Unit may be reduced to only interpret pilot's inputs (or flight inputs coming from the remote control interface and autopilot system), whilst most of the processing workload is now carried out by a plurality of transceiver units and their built in controller units CU.

When high redundancy is required, several transceiver units spatially distributed can be connected to the same electronic equipment, resulting in improved MTBF. This feature is also desirable when high ballistic impact resilience is required.

Figure 6:
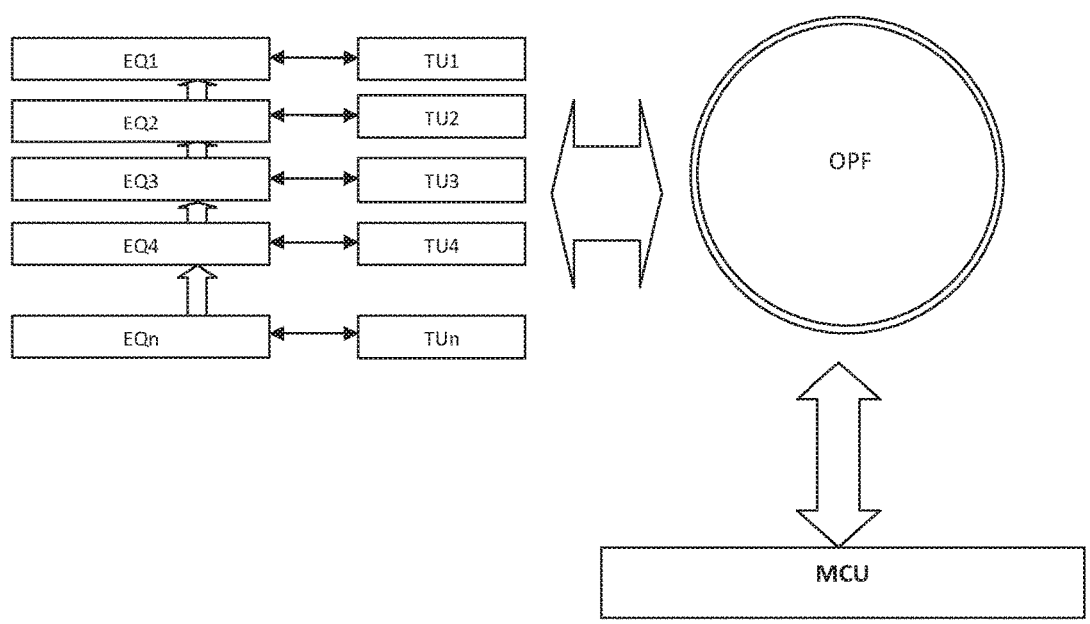
FIG. 6 is a block diagram of a notional optical apparatus according to the invention, comprising the master control unit, the transceiver units and their associated equipment, as well as the optical film enabling meshed networking (depicted a circle).

A general block diagram detailed in FIG. 6 shows that the polymer film waveguide OPF can enable vertical communication (between the aircraft's master control unit MCU and the various electronic equipments EQ1-EQn, via their associated transceiver units), as well as transverse (or mutual), communication, between the various electronic equipments EQ1-EQn (via their associated transceiver units) without necessarily requiring intervention from the master control unit MCU (regional management). The later may be desirable in the case of regional management, and/or when some autonomy from the master control unit MCU is necessary. This function may be useful in view of maintaining operational the vital functions of the aircraft, in the case where the master control unit MCU is faulty or cannot properly communicate. In each transceiver unit TU1-TUn (Transceiver Unit of order "n"), the instructions required to reroute signals and make autonomous decisions in the event of central processor malfunction are programmed into the controller unit driving the data interface. This distributed intelligence and self healing capability is capable of outperforming any conventional cable-based system and is made possible by using a polymer film OPF capable of establishing one or more isolated meshed networks.

Communication Protocol:

Each meshed network is capable of establishing data communications between pluralities of transceiver units, regardless of their physical location within the aircraft. Furthermore, each transceiver unit is capable of packet routing, networking and communication protocol management. In a preferred embodiment of the invention, the communication protocol utilized to interconnect the different transceiver units is based on Ethernet/TCP/IP suite (Transmission Control Protocol/Internet Protocol).

Data Access:

Different data access schemes may advantageously be used to suit different topologies:

i—TDMA (Time Division Multiple Access): In this sequential access mode, the data streams generated by each transceiver unit TU are multiplexed in time domain. Each transceiver unit TU is allocated a unique time slot in which it is allowed to transmit data. Each transceiver unit TU only transmits in its allocated time slot and receives during the rest of the time. This simple access mode is the preferred solution when few transceiver units TU are involved. Mutual synchronization between transceiver units TU insures that there is no timing overlap between adjacent time slots.

ii—CDMA (Code Division Multiple Access): in this access mode the payload (useful information) that needs to be transmitted across a meshed network is multiplied with a unique PRN code (Pseudo Random Noise is a signal similar to noise which satisfies one or more of the standard tests for statistical randomness) and the useful information (present in the main lobe of the spread signal) is filtered by an electrical filter BPF (FIG. 5). Multiplying the payload by a high chip rate PRN code results in spectral spreading where the resulting spectrum may be 10 times (or more) broader that the information's spectrum (Direct-Sequence Spread Spectrum). The resulting data stream is used to modulate the laser diodes (or LED). FIG. 5 depicts an optical link comprising the block diagrams of two optical frontends using CDMA access and belonging to two optical transceiver interfaces OT1, OT2. On the receiver side of the optical frontends, the optical signal is detected by the photodiodes p1, p2 and the useful information is regenerated through synchronized multiplication M of the received spread signal with the same PRN sequence used by the transmitter. By allocating a unique PRN code to each transmitter modulating the laser diodes (or LED) d1, d2 of each optical transceiver interface OT1, OT1, simultaneous transmission across the same medium (polymer film waveguide OPF) is possible, without suffering mutual interference. On the receiver side, the optical transceiver interface OT1 (connected to photodiodes p1) is capable of descrambling at any time the data stream transmitted by any other optical transceiver interface OT2, by multiplying the received signals by the PRN code specifically allocated to each optical transceiver interface that needs to be received. By performing a circular rotation of PRN codes, any given optical transceiver interface is capable of sequentially extracting the data streams transmitted by the optical transceiver interfaces OT1, OT2 and/or the aircraft's master control unit connected to the polymer film waveguide OPF. Another solution is to connect several receivers in parallel in the same optical transceiver interface, each one dedicated to a specific channel. Another advantage of direct sequence signal spreading is the inherent processing gain (proportional to the PRN chip rate, divided by the payload's data rate). This processing gain advantageously compensates the very high transmissions losses occurring in the polymer film waveguide OPF and is particularly effective on large systems. CDMA is the preferred access solution when a high number of transceiver units is involved.

iii—OFDM: this access mode utilizes multi-carrier modulation, in particular Orthogonal Frequency Division Multiplexing (OFDM). Like CDMA, this access mode is very robust to mutual interferences and is also a solution when a high number of transceiver units is involved.

iv—FSK: In a yet different embodiment of the invention, Frequency Shift Keying (FSK) of multiple subcarriers allocated to each transceiver unit may also be used.

Multi-Networking and Traffic Isolation:

The same polymer film waveguide OPF can simultaneously convey data communication related to flight control management, as well as engine management or any other vital function of the aircraft.

Information segregation may be required in order to prevent accidental interference (or cross-coupling) between vital functions, for instance to prevent a faulty uncontrolled transceiver unit from interfering with another transceiver unit sharing the same transmission medium. TDMA access is particularly vulnerable to timing interference and accidental time slot overlapping, whereas CDMA and OFM are quite resilient to code interferences.

In one embodiment of the invention, isolated meshed networks are created, in order to isolate vital functions from each other's. For instance, one meshed network may be dedicated to flight controls, whilst another meshed network is dedicated to engine management. Traffic isolation between meshed networks can be achieved by different means such as, but not limiting to:

Assigning a unique access mode to each meshed network (e.g. one meshed network uses TDMA access, whereas another meshed network uses CDMA or OFDM access).

Assigning a unique coding to each meshed network; for example using orthogonal codes between two meshed networks (orthogonal codes are such that their convolution product is equal to 0). Isolation provided by orthogonal codes can be as high as 20 dB.

Assigning significantly different subcarriers frequencies to the meshed networks, when OFDM access and/or FSK are used.

In a preferred embodiment of the invention, superior inter-networks isolation is achieved through the use of Wavelength Division Multiplexing (WDM), where one dedicated wavelength (color) is allocated to each meshed network. WDM requires equipping each optical transceiver interface OT1, OT2 of each transceiver unit belonging to a given meshed network with optical filters OF allowing the transmission of the optical wavelength (or frequency) allocated to that network and rejecting the wavelengths (or frequencies) used by other optical transceiver interfaces belonging to other networks. This optical filter OF can be a low pass filter (e.g. rejecting ultraviolet), or a high pass filter (e.g. rejecting infrared), or a band pass filter (e.g. tuned on a specific frequency/wavelength and rejecting all the other frequencies/wavelengths). For instance, optically isolating only two networks from each other's' can be easily achieved by fitting all the transceivers' optical interfaces of one network with low pass filter and using LED or LASER diodes transmitting at low frequency (long wavelength), whereas all the optical interfaces of the second network are fitted with high pass filter and would use LED or LASER diodes transmitting at high frequency (short wavelength). When the number of networks is higher than two, using bandpass filters specifically tuned to the frequency allocated to each network becomes a necessity.

In a WDM environment, all photodiodes (receivers) must be fitted with optical filters since photodiodes can usually receive over a broad spectrum. By contrast, LASER or LED diodes used on the transmitter side are inherently narrow band devices and usually produce narrow spectral lines; however, optical filters may also be used for safety, on the unit's transmitter interface, in order to block unwanted harmonics produced by the LASER or LED diodes, or erratic wavelength shifts that could accidentally jam other networks.

To summarize: central wavelength of the optical filters OF is tuned to the wavelength allocated to the meshed network it is part of and reject the unwanted wavelength(s) utilized by other meshed network(s) using the same optical transmission medium. The optical filters OF are fitted directly onto the optical transceiver interface OT1, OT2 that is, at least on the photodiode p1, p2 and additionally on the laser (or LED) diodes d1, d2. For example, the diode/photodiodes arrays related to flight controls will be equipped with their dedicated optical filters tuned on one wavelength, whereas the diode/photodiodes arrays dedicated to engine controls will be equipped with optical filters tuned on a different wavelength. This hardware based filtering is the preferred solution when several vital functions are sharing the same optical medium. Consequently, several meshed networks, each one operating at a different wavelength can operate concomitantly, using the same polymer film waveguide OPF as common transmission medium.

Additionally, inter-network isolation can be further enhanced by purposely allocating wavelengths according to the transmittance of the optical medium. For example, FIG. 4 shows the transmittance of a notional polymer, exhibiting low transmission losses at wavelengths between 400 nm and 800 nm and a peak of transmission loss in the region of 1700 nm. Wavelength allocation can be chosen in function of the physical size of the network (that is how physically distant transceiver units are from each other's). For instance, a small size meshed network covering a small area will preferably use a wavelength where the polymer offers high absorption hence limiting inter-network interference Enhanced inter-network segregation may be achieved through the appropriate choice of the optical wavelengths allocated to each meshed networks in respect with the optical transmission or absorption windows of the polymer film waveguide OPF. For instance, some long range meshed networks may be allocated one wavelength in the waveguide's window of best optical transmittance (400 nm to 800 nm in our example), whereas localized small size meshed networks may advantageously use wavelength in the optical window of maximum absorption (1700 nm in our example). By adding extra rejection in addition to what is already provided by optical filtering, this solution is particularly effective in preventing saturation of optical transceiver interfaces operating in physical proximity, but belonging to different meshed networks.

The omnidirectional and multimode propagation of light within the polymer film OPF combined with the light diffusion and scattering inherent to type of polymer formulation utilized to achieve ballistic impact resilience lead to intrinsically high transmission losses between transceiver units TU. Consequently, it may be desirable, when propagation over long distance is required, to increase the power of the laser diodes (or LED) 1, as well as leveraging spread spectrum techniques (CDMA) and the transmission improvements brought by the processing gain resulting from direct-sequence spread spectrum.

In yet another embodiment of the invention the controller units CU can be programmed with instructions enabling to act as active repeaters in order to relay and regenerate the light signals, enabling signal transmission over long distances. Each optical transceiver interfaces OT is subsequently equipped with several laser diodes (or LED) and several photodiodes. Transcoding may be required to prevent mutual interference and decouple uplink (incoming signal) from downlink (repeated signal). Several methods or a combination of the following methods can be used:

Allocating different time slots for the uplink and down link in the case of a TDMA access (at the expense of data carrying capacity).

Changing code in the case of CDMA access mode (uplink and downlink may use different PRN codes).

Changing wavelength (allocating different wavelengths to the uplink and downlink.

Referring to the disclosed architecture, the only remaining copper or aluminum cabling is the AC or DC power supply lines that feed the different system. In order to prevent SPOF, route diversity can be used, along with localized energy storage such as supercapacitors or battery banks to locally supply vital subsystems.

While the invention has been described in conjunction with a limited number of embodiments, it will be appreciated by those skilled in the art that many alternatives, modifications and variations in light of the foregoing description are possible. Accordingly, the present invention is intended to embrace all such alternatives, modifications and variations as may fall within the spirit and scope of the invention as disclosed. In addition, in this disclosure, the terms "comprise", "comprising" "include" or "including" do not exclude other elements or steps, the terms "a" or "one" do not exclude a plural number, and the term "and/or" means either or both.

The present application may be used as a basis or priority in respect of one or more future applications and the claims of any such future application may be directed to any one feature or combination of features that are described in the present application. Any such future application may include one or more of the following claims, which are given by way of example and are non-limiting in regard to what may be claimed in any future application.

This disclosure hereby incorporates by reference the complete disclosure of any patent or application from which it claims benefit or priority.

The invention claimed is:

1. A fault tolerant optical apparatus comprising:
   a transparent polymer film waveguide for transmitting light signals in an omnidirectional manner,
   a plurality of transceiver units each one comprising an optical transceiver interface, a controller unit and a data interface, said plurality of transceiver units being interconnected via the waveguide, in order to inject light signals to said waveguide and receive light signals from said waveguide, said plurality of transceiver units forming at least two isolated meshed networks,
   a dedicated wavelength being allocated to each meshed network, so that the transceiver units belonging to a meshed network only process light signals of the dedicated wavelength allocated to that network,
   a plurality of electronic equipments, each one connected to and managed by a transceiver unit,
   the controller unit embedded in each transceiver unit is programmed with instructions enabling the management of the electronic equipment connected to said transceiver unit, according to the light signals received by the optical transceiver interface embedded in said transceiver unit, the controller unit embedded in each transceiver unit is also programmed with instructions:
enabling the supervision of at least one more controller unit belonging to another transceiver unit being part of the same meshed network,
enabling the management of the electronic equipment connected to said another transceiver unit, in the event of a failure of said at least one more controller unit.

2. The apparatus according to claim 1, wherein the polymer film comprises macromolecules and doping elements capable of enhancing light diffusion and scattering in the material.

3. The apparatus according to claim 1, wherein optical discontinuities are created in the transparent polymer film waveguide in order to provide light sampling.

4. The apparatus according to claim 1, wherein each controller unit comprise one or more microcontrollers and/or Field Programmable Gate Array, programmed with instructions enabling networking, data access, data framing, bit insertion and Forward Error Correction functions.

5. The apparatus according to claim 1, wherein at least one controller unit embedded into a transceiver unit is programmed with instructions enabling that transceiver unit acting as active repeaters in order to relay and regenerate the light signals received by its own optical transceiver interface, said optical transceiver interface being fitted with optical filters.

6. The apparatus according to claim 1, wherein a communication protocol is used to interconnect the different controller units, said protocol being based on Ethernet or Transmission Control Protocol or Internet Protocol suite, or CAN.

7. The apparatus according to claim 1, wherein each meshed network is individually capable of establishing data communications between a plurality of transceiver units belonging to said meshed network, where data communication between the different transceiver units uses one or more of the following data access modes: Time Division Multiple Access; Code Division Multiple Access; Orthogonal Frequency Division Multiplexing; and/or Frequency and/or phase shift keying of multiple subcarriers.

8. The apparatus according to claim 1, wherein the optical transceiver interface of each transceiver unit belonging to a given meshed network, is equipped with an optical filter tuned to the wavelength allocated to said meshed network.

9. The apparatus according to claim 1, wherein the controller unit embedded in each transceiver unit is programmed with instructions enabling the autonomous management of the electronic equipment connected to said transceiver unit, according to preprogrammed sequence of instructions, in the event of a failure of the associated optical transceiver interface and/or in case of loss of light signals.

10. An aircraft with a fault tolerant optical apparatus comprising:
a transparent polymer film waveguide for transmitting light signals in an omnidirectional manner,
a plurality of transceiver units, each one comprising an optical transceiver interface, a controller unit and a data interface, said plurality of transceiver units being interconnected via the waveguide, in order to inject light signals to said waveguide and receive light signals from said waveguide, said plurality of transceiver units forming at least two isolated meshed networks,
a dedicated wavelength being allocated to each meshed network, so that the transceiver units belonging to meshed network only process light signals at the dedicated wavelength,
a plurality of electronic equipments, each one connected to and managed by a transceiver unit,
the controller unit embedded in each transceiver unit is programmed with instructions enabling the management of the electronic equipment connected to said transceiver unit, according to the light signals received by the optical transceiver interface embedded in said transceiver unit,
the controller unit embedded in each transceiver unit is also programmed with instructions:
enabling the supervision of at least one more controller unit belonging to another transceiver unit being part of the same meshed network,
enabling the management of the electronic equipment connected to said another transceiver unit, in the event of a failure of said at least one more controller unit.

11. The aircraft according to claim 10, comprising an airframe, wherein the optical apparatus is restrained or bonded onto said airframe.

12. The aircraft according to claim 10, comprising:
a master control unit,
the polymer film waveguide enabling communication between said master control unit and a plurality of transceiver units being part of a given meshed network,
said plurality of transceiver units being capable of mutual communication and autonomous processing without requiring intervention from said master control unit.

13. The aircraft according to claim 10, wherein the control units are programmed to operate in order to autonomously provide the processing required to maintaining safe flying condition in the event of the failure of a master control unit.

* * * * *